W. E. COFFIN.
COUPLING SHANK AND YOKE CONNECTION.
APPLICATION FILED FEB. 2, 1915.
Reissued Mar. 9, 1915. 13,889.
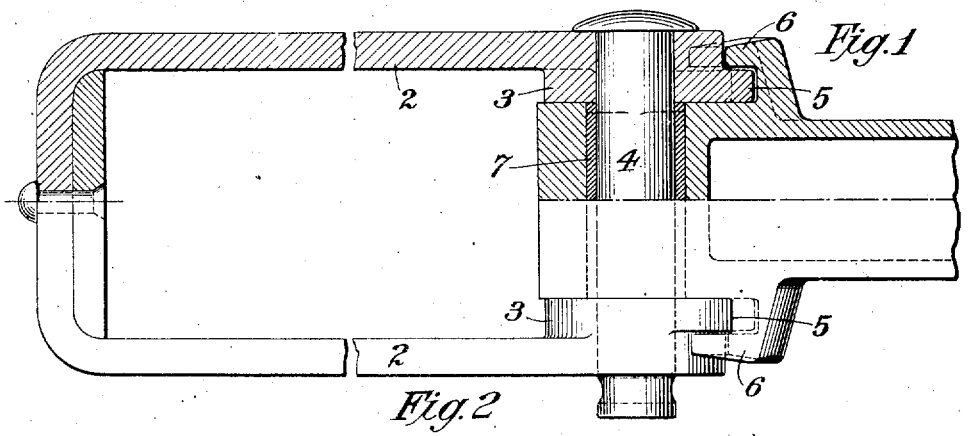
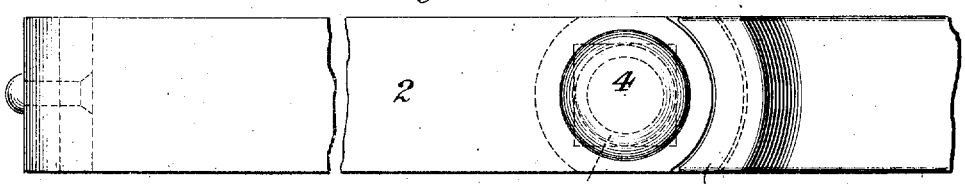
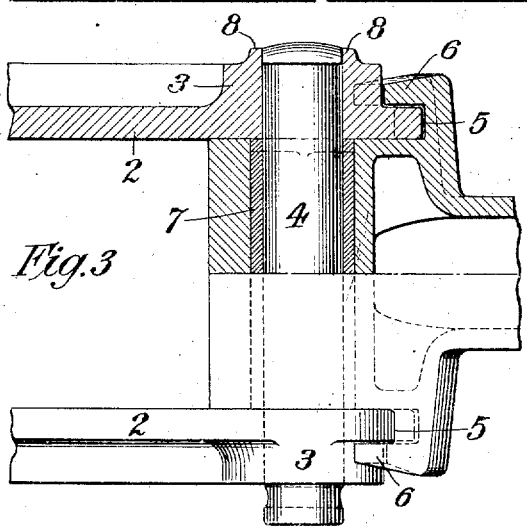
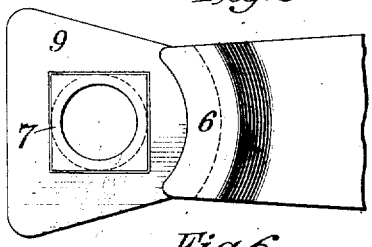
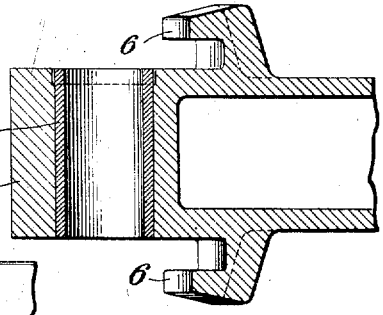
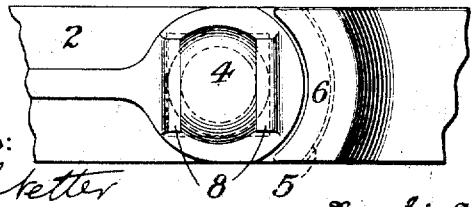
Witnesses:
Raphael Netter
C. D. Morrill
Inventor
Walter E. Coffin
By his Attorney
Clarence B. Kent

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

COUPLING-SHANK AND YOKE CONNECTION.

13,889. Specification of Reissued Letters Patent. Reissued Mar. 9, 1915.

Original No. 1,097,536, dated May 19, 1914, Serial No. 667,346. Application for reissue filed February 2, 1915. Serial No. 5,805.

*To all whom it may concern:*

Be it known that I, WALTER E. COFFIN, of Cleveland, Cuyahoga county, Ohio, have invented a new and useful Improvement in Coupler-Shank and Yoke Connections, of which the following is a full, clear and exact description, reference being had to the accompanying drawings, forming part of this specification, in which—

Figure 1 is a view, partly in side elevation and partly in vertical section, of a device embodying my invention; Fig. 2 is a plan view of the same; Fig. 3 is a view partly in side elevation and partly in vertical section, showing a portion of the device on a larger scale than in Fig. 1; Fig. 4 is a plan view of a portion of the device, showing means for locking the connecting pin or bolt; Fig. 5 is a plan view of the rear end portion of the coupler shank and showing a slight modification thereof, and Fig. 6 is a vertical section of the rear end portion of the coupler shank.

My invention has relation to means of improved character for connecting the coupler shanks of car couplers to draft rigging yokes, and is designed to provide a simple and convenient form of connection in which the parts can be readily disconnected either by a straight rearward movement of the yoke or by a forward movement of the coupler shank, in order to facilitate car repairs, as hereinafter more fully described.

In the accompanying drawings, the numeral 2 designates the yoke, which is of the usual U-form, open at its forward end. Both forward ends of the yoke are in the form of enlarged bosses 3, which are of greater vertical depth than the thickness of the arms of the yoke, so as to provide a substantial bearing area for the body of the connecting pin or bolt 4. Extending forwardly from each of the bosses 3 is a flange or ledge 5, which is rounded at its forward edge to a radius whose center is coincident with the center of the pin or bolt 4. These ledges or flanges are overlapped by upwardly and rearwardly extending lips 6, which are formed at the upper and lower sides of the rear end of the coupler shank, and whose rear edges are similarly rounded so that the yoke is free to have an angular movement relative to the coupler shank moving about the pin or bolt 4 as a pivot. The purpose of the lip and ledge engagement of the shank and yoke is to prevent the two arms of the yoke, which are not connected at their forward ends, from spreading, and thereby throwing so great a bending movement upon the pin or bolt as to cause it to bend.

The parts can be readily assembled, and the construction is a very convenient one in facilitating car repairs. After removing the pin or bolt 4, the yoke and coupler can be disengaged either by a straight rearward movement of the yoke, or by a forward movement of the coupler shank. This enables the draft gear to be disengaged and dropped down from the car frame without removing the coupler entirely from its position, and simply by sliding the coupler forward to an extent sufficient to disengage it from the yoke.

7 designates a bushing for the pin or bolt, seated in the rear end portion of the coupler shank. To prevent the pin from turning, its head may be flattened on two sides, and these flat sides engaged by lugs or lips 8, as shown in Fig. 4.

In Fig. 5 I have shown a slight modification, in which the rear end portion 9 of the coupler shank is of tapered or flaring form.

What I claim is:

In a coupler shank and yoke connection, a draft rigging yoke having upper and lower arms; a vertical portion connecting said arms at their rear ends, the forward ends of said arms having enlarged bosses of greater vertical depth than the thickness of the arms; pin-holes in said bosses; a coupler-shank adapted to angle laterally with said yoke and to seat between said bosses and having a pin-hole registering with the holes in said bosses, the bosses being rounded at their forward ends; projections on the top and bottom of the coupler shank, having concave vertical faces, said projections being adapted to overlie said bosses and prevent spreading of the arms; plane longitudinal bearing surfaces upon the top and bottom of the coupler-shank to the rear of said concave vertical faces; and engaging plane longitudinally-extending bearings on the inner faces of said bosses, whereby longitudinal movement of either yoke or coupler-shank, after removal of the pin, will permit the disengagement of said coupler.

In testimony whereof, I have hereunto set my hand this 25th day of January, 1915.

WALTER E. COFFIN.

Witnesses:

HARRY E. ORR,

HUBERT L. SPENCE.